(12) United States Patent
Wahl

(10) Patent No.: US 7,051,829 B2
(45) Date of Patent: May 30, 2006

(54) NO-SLIP DRIVE SPROCKET

(75) Inventor: David Wahl, Greenbush, MN (US)

(73) Assignee: Wahl Bros. Racing, Greenbush, MN (US)

( * ) Notice: Subject to any disclaimer, the term of this patent is extended or adjusted under 35 U.S.C. 154(b) by 278 days.

(21) Appl. No.: 10/059,752

(22) Filed: Jan. 28, 2002

(65) Prior Publication Data
US 2003/0141125 A1 Jul. 31, 2003

(51) Int. Cl.
B62M 29/02 (2006.01)

(52) U.S. Cl. .................. 180/194; 180/191; 30/195

(58) Field of Classification Search ............ 180/191, 180/194; 305/193, 195, 199
See application file for complete search history.

(56) References Cited

U.S. PATENT DOCUMENTS

| 3,472,563 | A | * | 10/1969 | Irgens | 305/199 |
| 3,575,474 | A | * | 4/1971 | Russ, Sr. | 305/193 |
| 4,987,965 | A | | 1/1991 | Bourret | |
| 5,709,440 | A | | 1/1998 | Lecours | |
| 6,000,766 | A | | 12/1999 | Takeuchi et al. | |
| 2003/0111904 | A1 | * | 6/2003 | Cormican | 305/199 |

OTHER PUBLICATIONS http://www.blackmagicracing.com/2002SiteLink/Level-6/antiratchet.htm (1 page, copyright 2001).
http://www.blackmagicracing.com/2003Pages/2003CatalogHTML/antiratchetsprocket.htm (2 pages, copyright 2002-2003).
Western Power Sports copyright and catalog pages (6 pages, copyright 2001).
SKI-DOO, figure from Catalogue de Pieces/Parts Catalog, Formula Plus X Mx X, 1991.
SKI-DOO, figure from Catalogue de Pieces/Parts Catalog, Alpine II, 1991.
SKI-DOO, figure from Catalogue de Pieces/Parts Catalog, Citation/E, Tundra/LT, 1991.

* cited by examiner

Primary Examiner—Lesley D. Morris
Assistant Examiner—Matthew Luby
(74) Attorney, Agent, or Firm—Dane C. Butzer

(57) ABSTRACT

A drive sprocket for a snowmobile, a drive train using the sprocket, and a method of using the sprocket to drive a track for a snowmobile. The drive sprocket includes a round base, a plurality of convolute lugs on the base, and a plurality of involute lugs on both sides of the base. The base is preferably disk shaped, and the convolute lugs are preferably aligned with the involute lugs. In the preferred embodiment, a number of convolute lugs is one half a number of involute lugs. The convolute lugs should line up with windows in a track for the snowmobile, and the involute lugs should line up with gaps between knobs on the track for the snowmobile. Preferably, the sprocket also includes a hub with a through hole for a drive shaft and stiffening arms radiating from the hub.

17 Claims, 4 Drawing Sheets

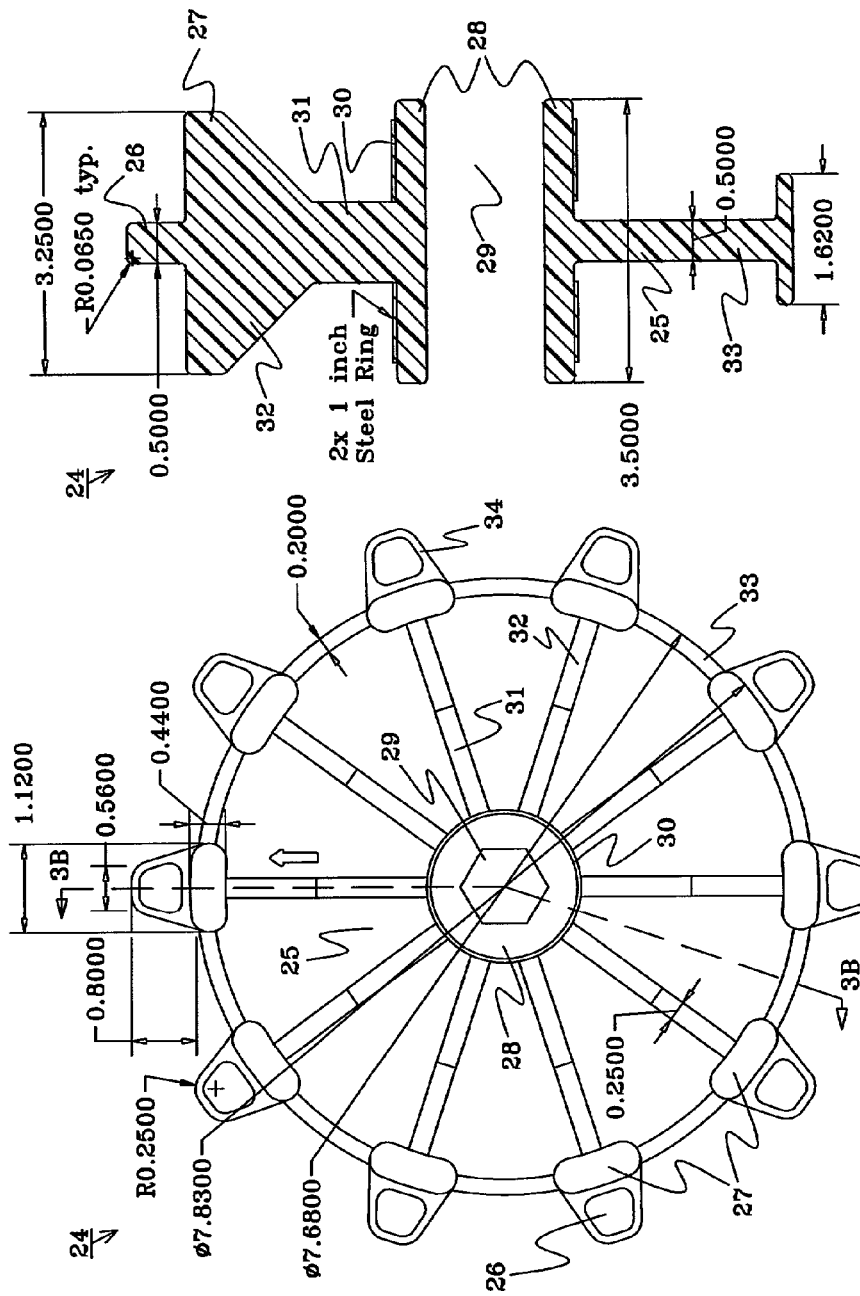

NO-SLIP DRIVE SPROCKET

BACKGROUND OF THE INVENTION

1. Field of the Invention

This invention relates to drive sprockets of the type used with snowmobiles. In particular, the invention relates to a drive sprocket for use with snowmobile tracks that have open windows.

2. Description of the Related Art

Snowmobiles are becoming increasingly popular for travel over snow, ice, and other surfaces. In addition, demand is increasing for faster and more powerful snowmobiles. This demand for more speed and power is particularly evident in the sport of snowmobile racing, although the demand also exists in the general market.

A snowmobile uses a drive train with a track for propulsion. The track is in contact with the surface over which the snowmobile runs. Drive sprockets propel the track, which in turn propels the snowmobile.

In conventional snowmobiles, four to six drive sprockets are required to propel the track. These sprockets have involute (i.e., internal) drive lugs extending from the sprocket's sides. The drive lugs push against knobs on the inside surface of the track. This arrangement is adequate for use at lower speeds and powers. However, as speed and power increase, the drive lugs can slip or "ratchet" over the knobs, resulting in a loss of power transferred through the track to the surface over which the snowmobile is operating.

One proposed solution to the problem of slippage is to use a sprocket with convolute (i.e., external) drive lugs. This sprocket has an appearance somewhat akin to a gear. The convolute lugs fit into windows (i.e., hole.) in the track. When the sprocket turns, it pushes against the front edges of the windows, driving the track. The spans of track between the windows can be covered in steel or other reinforcing material so as to withstand the driving force better. However, while this convolute design is superior to the involute design, slippage can still occur at higher speeds and powers. In addition, four to six drive sprockets are still typically required.

Yet another proposed solution is to use a sprocket with involute lugs on one side in addition to convolute lugs. This type of sprocket is known as an "extrovert" sprocket. Unfortunately, when the involute lugs drive the track, all of the applied force comes from one side of the sprocket. As a result, these types of sprockets can deform, again leading to slippage problems.

Finally, some existing snowmobiles use a combination of involute and convolute drive sprockets. With this arrangement, at least four sprockets are still needed. Furthermore, the two different types of sprockets drive different types of structures in the track. As a result, synchronizing the sprockets to apply force evenly is problematic.

SUMMARY OF THE INVENTION

Accordingly, a need exists for a snowmobile drive train and drive sprockets that address the foregoing slippage problems. In addition, it would be advantageous to use only two sprockets as long as adequate power and speed can be delivered without slippage. Use of only two sprockets can allow for a more compact drive train that is easier to assemble, synchronize and maintain.

The invention addresses these needs with a drive sprocket for a snowmobile that includes a round base, a plurality of convolute lugs on the base, and a plurality of involute lugs on both sides of the base. The base is preferably disk shaped, and the convolute lugs are preferably aligned with the involute lugs. In the preferred embodiment, a number of convolute lugs is one half a number of involute lugs. The convolute lugs should line up with windows in a track for the snowmobile, and the involute lugs should line up with gaps between knobs on the track for the snowmobile.

Preferably, the sprocket also includes a hub with a through hole for a drive shaft and stiffening arms radiating from the hub. The stiffening arms can include braces for the involute lugs. Further stiffening can be achieved with raised rims on each side of the base. Likewise, the convolute lugs can include stiffening ridges.

The invention also concerns a drive train using the sprocket, and a method of using the sprocket to drive a track for a snowmobile.

The novel sprocket according to the invention provides a superior transfer of force, even at high power and/or speeds. As a result, slippage tends to be reduced. Furthermore, use of only two such sprockets is adequate for most applications.

This brief summary has been provided so that the nature of the invention may be understood quickly. A more complete understanding of the invention may be obtained by reference to the following description of the preferred embodiments thereof in connection with the attached drawings.

BRIEF DESCRIPTION OF THE DRAWINGS

FIGS. 3A and 3B show a preferred embodiment of the sprocket according to the invention with ten convolute lugs and twenty involute lugs.

DESCRIPTION OF THE PREFERRED EMBODIMENT

Figure 1:
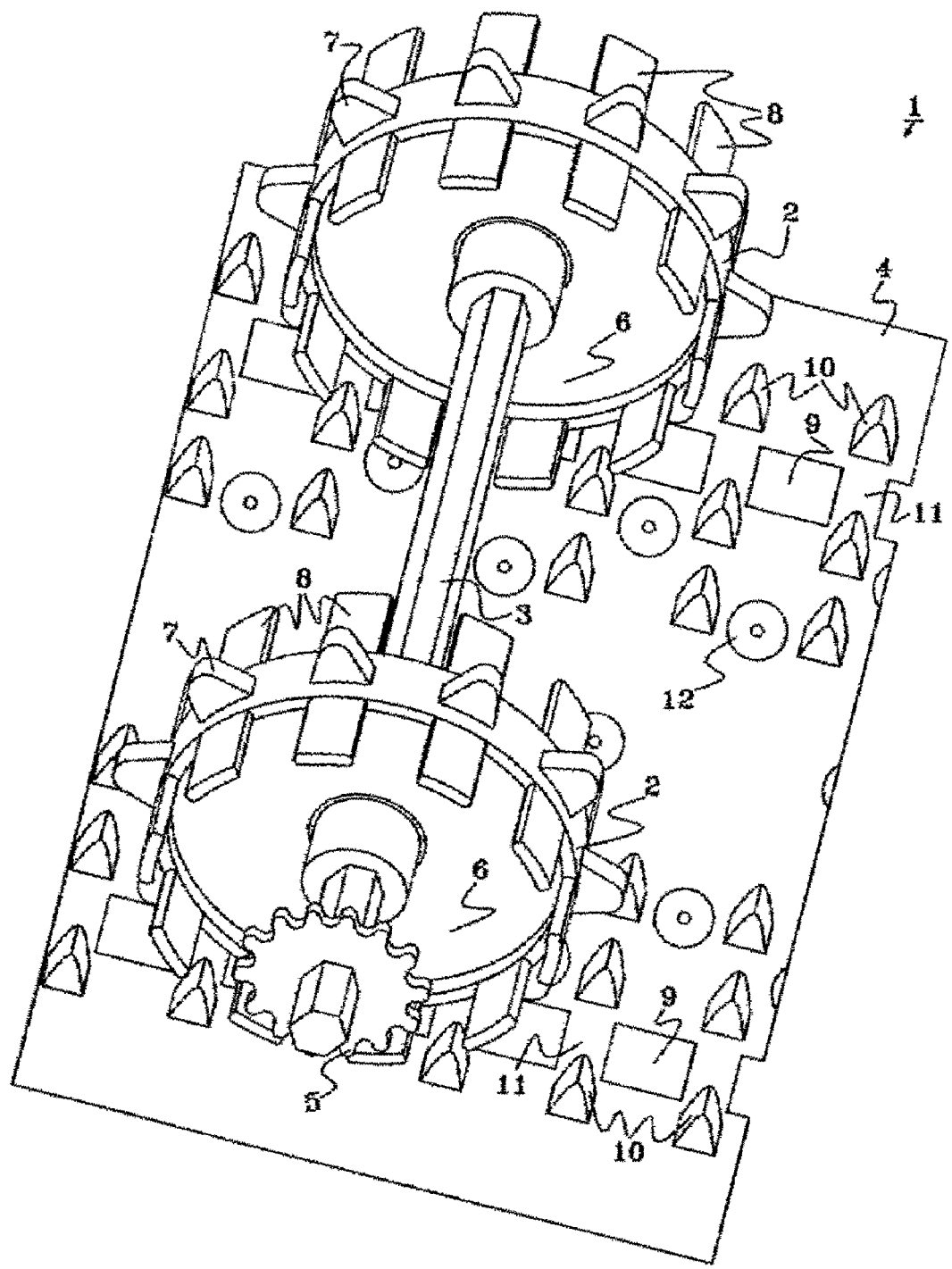
FIG. 1 shows a drive train including two sprockets according to the invention.

FIG. 1 shows a drive train including two drive sprockets according to the invention. The drive train also includes a drive shaft running between the sprockets, a drive gear on the shaft, and a track with windows and knobs matching the sprockets. The sprockets are for driving the track.

In more detail, drive train 1 includes sprockets 2 on drive shaft 3. The sprockets drive track 4 when drive shaft 3 is rotated, for example by drive gear 5 on one end of the shaft. Other arrangements for driving the sprockets are within the scope of the invention.

Each sprocket in FIG. 1 includes round base 6, a plurality of convolute lugs 7 on the base, and a plurality of involute lugs 8 on both sides of the base. In order to drive track 4, convolute lugs 7 line up with windows 9 in the track, and involute lugs 8 line up with gaps between knobs 10 on each side of windows 9. In operation, convolute lugs 7 push on the edges of windows 8, and involute lugs 8 push on knobs 10.

Preferably, knobs 10 and bars 11 between windows 9 are reinforced, for example by being sheathed in steel, so as to withstand better the force applied by sprockets 2. Track 4 also can include elements for providing improved traction under high speed and power, for example spikes 12 extending through to the opposite side of track 4 from the drive train.

As is evident from FIG. 1, if the involute lugs push on the knobs on both sides of the windows, the convolute lugs push on edges of the windows. Also as shown in FIG. 1 (and FIGS. 2A, 3A and 4), the involute lugs are as wide where the involute lugs meet the base as a width of the convolute lugs where the convolute lugs meet the base.

The foregoing arrangement provides a superior transfer of force from sprockets 2 to track 4. As a result, good performance can be achieved with only two sprockets. Use of only two sprockets results in a more compact drive train that is easier to assemble, synchronize and maintain.

While the invention permits use of only two sprockets, the invention is not limited to two sprockets. Any number of sprockets that will fit within the drive train can be utilized. When four or six sprockets according to the invention are used, even superior non-slippage and force transfer can be achieved. For lighter applications, one no-slip sprocket may be adequate.

Thus, the invention is not limited to the particular drive train and track shown in FIG. 1. Rather, this drive train and track merely represent one possible arrangement for utilizing no-slip drive sprockets according to the invention.

Figures 2A, 2B:
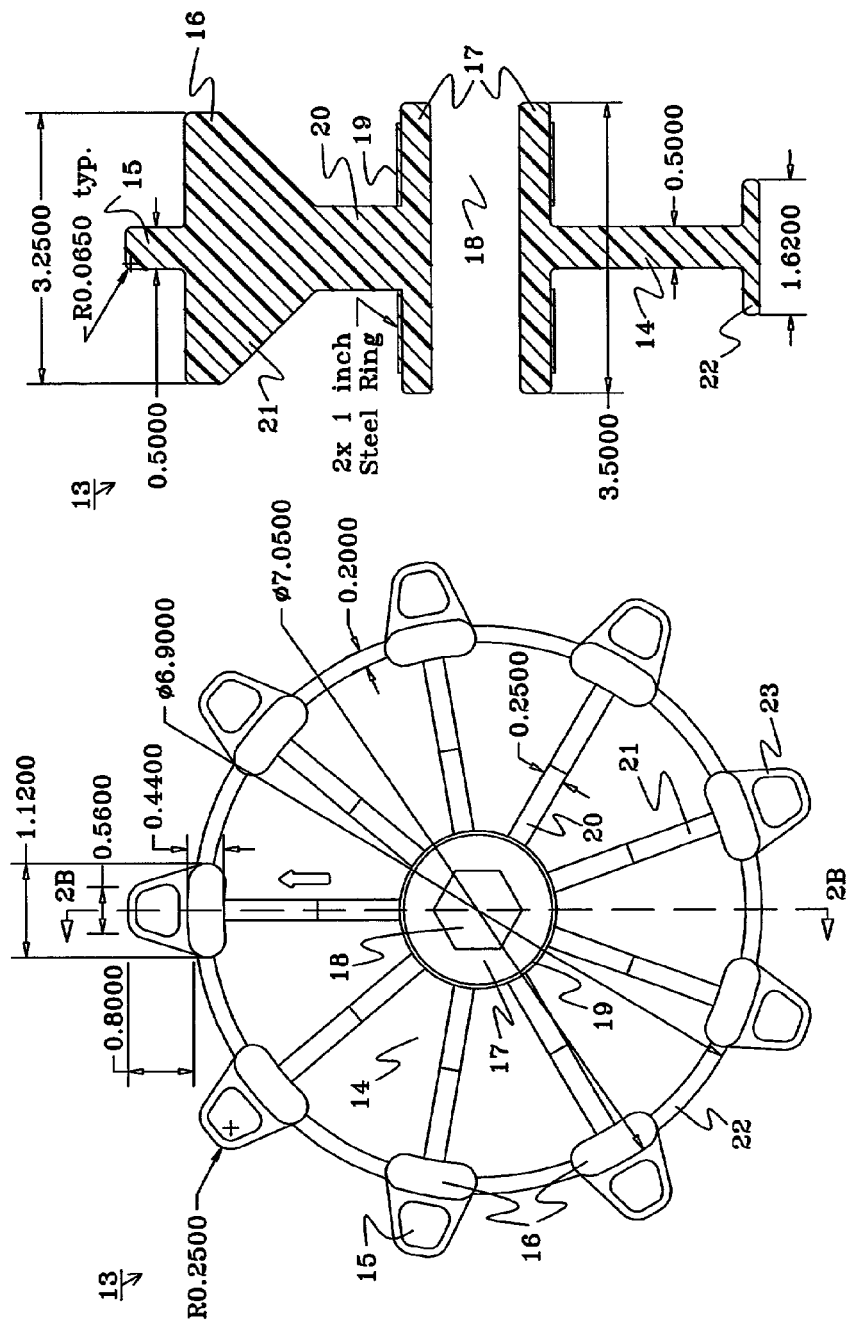
FIGS. 2A and 2B show a preferred embodiment of the sprocket according to the invention with nine convolute lugs and eighteen involute lugs.

FIGS. 2A and 2B show a preferred embodiment of the sprocket according to the invention with nine convolute lugs and eighteen involute lugs. FIG. 2B is a sectional view of FIG. 2A.

Briefly, a drive sprocket according to the invention includes a round base, a plurality of convolute lugs on the base, and a plurality of involute lugs on both sides of the base. The base is preferably disk shaped, and the convolute lugs are preferably aligned with the involute lugs. In the preferred embodiment, a number of convolute lugs is one half a number of involute lugs.

In more detail, sprocket 13 includes base 14, which is preferably made of a hardened plastic. Base 14 can be made of other materials, for example stainless steel. The base preferably is disk-shaped. Other shapes can be used. For example, the base could be spoked like a bicycle tire.

Sprocket 13 also includes a plurality of convolute lugs 15 on the edge of the base and a plurality of involute lugs 16 on both sides of the base. Preferably, the involute lugs are near or adjacent to the edge of the base. Also preferably, convolute lugs 15 are aligned with involute lugs 16. However, the invention also includes sprockets in which the lugs are not so aligned.

In FIGS. 2A and 2B, a number of convolute lugs is one half a number of involute lugs. In particular, the number of convolute lugs is nine, and the number of involute lugs is eighteen. Other ratios of convolute lugs to involute lugs are possible.

The sprocket according to the invention preferably includes hub 17 with through hole 18 for a drive shaft. Preferably, through hole 18 is hexagonal in shape, although other shapes may be used. In order to provide extra strength, steel rings 19 preferably encircle hub 17. Use of such steel rings is not mandatory.

Sprocket 13 can be further strengthened by use of stiffening arms 20 that radiate from hub 17. Further strength can be provided by braces 21 for involute lugs 16 and raised rims 22 on each side of the base. The convolute lugs themselves also can be reinforced with stiffening ridges 23. Other stiffening and strengthening elements can be incorporated without departing from the invention. Likewise, while all of the strengthening and stiffening elements shown in FIGS. 2A and 2B may be desirable, the invention includes embodiments that do not include these strengthening and stiffening elements.

FIGS. 3A and 3B show a preferred embodiment of the sprocket according to the invention with ten convolute lugs and twenty involute lugs.

Sprocket 24 includes base 25, which is preferably made of a hardened plastic. Base 25 can be made of other materials, for example stainless steel. The base preferably is disk-shaped. Other shapes can be used. For example, the base could be spoked like a bicycle tire.

Sprocket 24 also includes a plurality of convolute lugs 26 on the edge of the base and a plurality of involute lugs 27 on both sides of the base. Preferably, the involute lugs are near or adjacent to the edge of the base. Also preferably, convolute lugs 26 are aligned with involute lugs 27. However, the invention also includes sprockets in which the lugs are not so aligned.

In FIGS. 3A and 3B, a number of convolute lugs is one half a number of involute lugs. In particular, the number of convolute lugs is ten, and the number of involute lugs is twenty. Other ratios of convolute lugs to involute lugs are possible.

The sprocket according to the invention preferably includes hub 28 with through hole 29 for a drive shaft. Preferably, through hole 29 is hexagonal in shape, although other shapes may be used. In order to provide extra strength, steel rings 30 preferably encircle hub 28. Use of such steel rings is not mandatory.

Sprocket 24 can be further strengthened by use of stiffening arms 31 that radiate from hub 28. Further strength can be provided by braces 32 for involute lugs 27 and raised rims 33 on each side of the base. The convolute lugs themselves also can be reinforced with stiffening ridges 34. Other stiffening and strengthening elements can be incorporated without departing from the invention. Likewise, while all of the strengthening and stiffening elements shown in FIGS. 3A and 3B may be desirable, the invention includes embodiments that do not include these strengthening and stiffening elements.

FIGS. 2A, 2B, 3A and 3B all include measurements and dimensions for best modes as contemplated by the inventor for no-slip drive sprockets according to the invention. The invention is not in any way limited to these particular measurements and dimensions. Likewise, the invention is not limited to the numbers of lugs shown in these figures. Rather, any number of convolute and involute lugs may be used as long as sufficient lugs are present to transfer adequate force to a track for a particular application.

Figure 4:
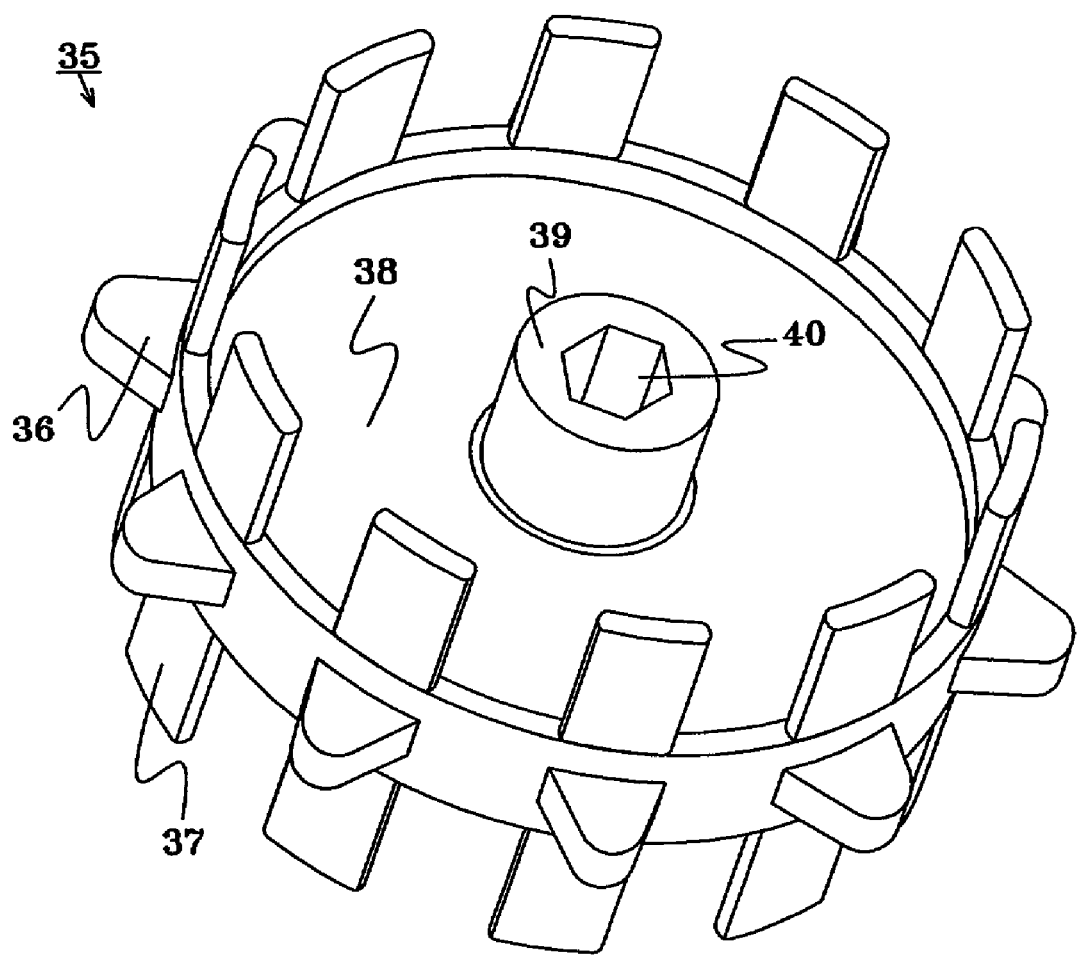
FIG. 4 shows a perspective view of a drive sprocket according to the invention.

FIG. 4 shows a perspective view of a drive sprocket according to the invention. This figure is provided to assist in understanding the overall structure of a no-slip sprocket according to the invention.

In FIG. 4, drive sprocket 35 includes convolute lugs 36 and involute lugs 37 on disk-shaped base 38. The sprocket also includes hub 39 with through hole 40 for a drive shaft. Sprocket 35 is a simplified embodiment of the invention in which many of the strengthening and stiffening elements shown in FIGS. 2A, 2B, 3A and 3B have been omitted.

The involute lugs for each no-slip drive sprockets according to the invention preferably have a cross-section of an oval curved around an outside edge of the round base for that sprocket, as shown in FIGS. 1, 2A, 3A and 4.

Alternative Embodiments

Although preferred embodiments of the invention are disclosed herein, many variations are possible which remain within the content, scope and spirit of the invention, and these variations would become clear to those skilled in the art after perusal of this application.

What is claimed is:

1. A drive sprocket for a snowmobile that includes a track including windows and knobs on both sides of the windows, comprising:
   a round base;
   a plurality of convolute lugs on the base that line up with the windows in the track; and
   a plurality of involute lugs on both sides of the base that line up with gaps between the knobs on the track;
   wherein if the involute lugs push on the knobs on both sides of the windows, the convolute lugs push on edges of the windows, wherein the involute lugs are as wide as where the involute lugs meet the base as a width of the convolute lugs where the convolute lugs meet the base.

2. A drive sprocket as in claim 1, wherein the base is disk shaped.

3. A drive sprocket as in claim 1, wherein the convolute lugs are aligned with the involute lugs.

4. A drive sprocket as in claim 1, wherein a number of convolute lugs is one half a number of involute lugs.

5. A drive sprocket as in claim 4, wherein the number of convolute lugs is nine or ten, and the number of involute lugs is eighteen or twenty.

6. A drive sprocket as in claim 1, wherein the convolute lugs line up with the windows in the track for the snowmobile, and the involute lugs line up with gaps between the knobs on the track for the snowmobile.

7. A drive sprocket as in claim 1, further comprising a hub with a through hole for a drive shaft and stiffening arms radiating from the hub, wherein the stiffening arms include braces for the involute lugs.

8. A drive sprocket as in claim 1, further comprising raised rims on each side of the base, the raised rims stiffening the base.

9. A drive sprocket as in claim 1, wherein the convolute lugs further include stiffening ridges.

10. A drive sprocket as in claim 1, wherein said involute lugs have a cross-section of an oval curved around an outside edge of said round base.

11. A method of driving a track for a snowmobile that includes a track including windows and knobs on both sides of the windows, comprising the steps of:
   pushing on edges of the windows; and
   pushing on the knobs on both sides of the window;
   wherein the pushing steps are carried out by at least one drive sprocket that rotates to drive the track, each drive sprocket further comprising a round base, a plurality of convolute lugs on the base, and a plurality of involute lugs on both sides of the base; and
   wherein if the involute lugs push on the knobs on both sides of the windows, the convolute lugs push on edges of the windows, wherein the involute lugs are as wide as where the involute lugs meet the base as a width of the convolute lugs where the convolute lugs meet the base.

12. A method as in claim 11, wherein the convolute lags line up with the windows in the track, and the involute lugs line up with gaps between the knobs on the track.

13. A method as in claim 11, wherein the number of drive sprockets carrying out the pushing steps for the snowmobile is exactly two.

14. A drive train for a snowmobile, comprising:
   a drive shaft;
   a track including windows and knobs on both sides of the windows; and
   one or more drive sprockets on the drive shaft, the drive sprockets for driving the track;
   wherein each drive sprocket further comprises:
   a round base;
   a plurality of convolute lugs on the base; and
   a plurality of involute lugs on both sides of the base;
   wherein if the involute lugs push on both sides of the windows, the convolute lugs push on edges of the windows, wherein the involute lugs are as wide as where the involute lugs meet the base as a width of the convolute lugs where the convolute lugs meet the base.

15. A drive train as in claim 14, wherein the convolute lugs line up with windows in the track, and the involute lugs line up with gaps between knobs on the track.

16. A drive train as in claim 14, wherein a number of convolute lugs on each drive sprocket is one half a number of involute lugs on each drive sprocket.

17. A drive train as in claim 14, further comprising a gear on the drive shaft for driving the drive train.

* * * * *